United States Patent
Cheng et al.

(10) Patent No.: US 11,171,335 B2
(45) Date of Patent: Nov. 9, 2021

(54) FAST CHARGEABLE CARBON ANODE MATERIAL WITH INNER CHANNELS

(71) Applicant: NEC CORPORATION, Tokyo (JP)

(72) Inventors: Qian Cheng, Tokyo (JP); Noriyuki Tamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 453 days.

(21) Appl. No.: 15/758,132

(22) PCT Filed: Sep. 9, 2015

(86) PCT No.: PCT/JP2015/004579
§ 371 (c)(1),
(2) Date: Mar. 7, 2018

(87) PCT Pub. No.: WO2017/042849
PCT Pub. Date: Mar. 16, 2017

(65) Prior Publication Data
US 2018/0248187 A1    Aug. 30, 2018

(51) Int. Cl.
| | |
|---|---|
| H01M 4/587 | (2010.01) |
| H01M 4/36 | (2006.01) |
| H01M 4/62 | (2006.01) |
| H01M 10/0525 | (2010.01) |
| C01B 32/05 | (2017.01) |

(52) U.S. Cl.
CPC .......... *H01M 4/587* (2013.01); *C01B 32/05* (2017.08); *H01M 4/366* (2013.01); *H01M 4/625* (2013.01); *H01M 10/0525* (2013.01); *C01P 2006/11* (2013.01); *C01P 2006/14* (2013.01); *C01P 2006/16* (2013.01)

(58) Field of Classification Search
None
See application file for complete search history.

(56) References Cited

U.S. PATENT DOCUMENTS

| | | |
|---|---|---|
| 2012/0021294 A1 | 1/2012 | Zhamu et al. |
| 2015/0014582 A1 | 1/2015 | Lui et al. |
| 2017/0133680 A1 | 5/2017 | Cheng et al. |

FOREIGN PATENT DOCUMENTS

| | | |
|---|---|---|
| JP | 2014-152042 A | 8/2014 |
| JP | 2014-229517 A | 12/2014 |
| WO | 2010/110441 A1 | 9/2010 |
| WO | 2010/150859 A1 | 12/2010 |

OTHER PUBLICATIONS

Suga et al. (JP, 2014-229517) (a raw machine translation) (Abstract and Detailed Description) (Dec. 8, 2014) (Year: 2014).*

(Continued)

*Primary Examiner* — Carmen V Lyles-Irving
(74) *Attorney, Agent, or Firm* — Sughrue Mion, PLLC (57) ABSTRACT

To provide an anode material for implementing a lithium-ion battery that is capable of high-speed charging and excellent in cycle characteristics, and has high capacity. The anode material includes a spherical particle of graphite or graphite-carbon composite provided with pores on the surface and inner channels in the core part of the particle, the inner channels being interconnected to the pores.

10 Claims, 6 Drawing Sheets

(56) References Cited

OTHER PUBLICATIONS

Noguchi et al. (JP, 2014-152042) (a raw machine translation) (Abstract and Detailed Description) (Aug. 25, 2014) (Year: 2014).*
International Search Report for PCT/JP2015/004579 dated Dec. 22, 2015 [PCT/ISA/210].
Written Opinion for PCT/JP2015/004579 dated Dec. 22, 2015 [PCT/ISA/237].

* cited by examiner

FAST CHARGEABLE CARBON ANODE MATERIAL WITH INNER CHANNELS

CROSS REFERENCE TO RELATED APPLICATIONS

This application is a National Stage of International Application No. PCT/JP2015/004579 filed Sep. 9, 2015.

TECHNICAL FIELD

The present invention relates to a carbon anode material with inner channels in the core part interconnected to the surface pores of a graphite or graphite-carbon composite particle. The carbon anode material is useful for a fast chargeable anode material of a lithium-ion battery.

BACKGROUND ART

Lithium-ion (Li-ion) batteries have been widely used for portable electronics, and they are being intensively pursued for hybrid vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety, and cycle life of current electrode materials. Of all the properties, the charging time as well as the power density is the most important characteristics for the battery, especially as the application targets of Li-ion batteries move from small mobile devices to transportation. This is because EV users, for example, are hardly to wait more than half an hour to charge their vehicles during a long drive compared with a refueling period of less than 5 min for gasoline cars. The speed of charge greatly depends on the lithiation rate capability of anode materials.

At present, graphite is the most popular and practical anode material for Li-ion batteries because of its low cost, high capacity, relatively long cycle life, and ease of processing. However, the small interlayer spaces (0.335 nm), the lack of Li-ion intercalation sites on the natural graphite basal plane, and the long diffusion range among the graphite interlayers result in a limited lithiation rate capability of graphite anode materials. Amorphous carbon such as soft carbon and hard carbon usually have larger interlayer spaces than graphite, offering a faster lithium input rate than graphite. However, soft carbon usually has a limited capacity (around 250 mAh/g) and higher average potential while charging and discharging, it is difficult to be used in Li-ion batteries with high energy density. Hard carbon has a capacity around 400 mAh/g, but its low density, low coulombic efficiency, and high cost make it difficult to use in batteries for EVs and PHVs at a low enough cost. Other high capacity anode materials such as silicon and tin alloys have even worse lithiation rate capabilities because of the low kinetics of lithium alloying and the accessibility of lithium ion through thick SEI.

There are some attempts such as US2015/0014582 A1 tried to composite carbon with $Li_4Ti_5O_{12}$ for fast chargeable lithium ion batteries. Moreover, US2012/0021294 A1 propose a carbon core bonded with satellite parties to be used in the high-rate anode materials for lithium ion batteries.

WO2010/110441 A1 proposes a negative electrode material for nonaqueous electrolyte secondary battery exhibiting an excellent property satisfying both rapid charge-discharge characteristics and high cycle characteristics. There is disclosed the negative electrode material comprising carbon material A that is spherical graphite particle covered with amorphous carbon and carbon material B that is spherical graphite particle.

WO2010/150859 A1 also proposes a fast chargeable and dischargeable macroporous graphite electrode material having macropores in which a ratio of specific surface area of micropores in relation to total specific surface area is 0-0.74 and a ratio of D band area and G band area in Raman spectrum (D/G area ratio) is 0-1.33. Such a macroporous graphite electrode material is manufactured by mingling a mold made of $SiO_2$ particles with a solution of carbon source, removing a solvent or the like, resinifying the carbon source to form a composite of a carbon precursor resin and the mold, heat treating the composite and removing the mold.

CITATION LIST

Patent Literature

PTL 1: US2015/0014582 A1
PTL 2: US 2012/0021294 A1
PTL 3: WO2010/110441 A1
PTL 4: WO2010/150859 A1

SUMMARY OF INVENTION

Technical Problem

However, prior art did not provide anode materials having both fast charging capability, long cyclability, high capacity, high coulombic efficiency as well as easy processing.

Therefore, an object of the present invention is to provide a carbon anode material having both fast charging capability, long cyclability, high capacity, high coulombic efficiency as well as easy processing.

Solution to Problem

In order to solve these problems, a new material is proposed to improve the rate capability, coulombic efficiency, cyclability of anode materials by means of creating an inner channel structure such as hollow spaces or cracks in a core part that are interconnected to surface pores of the spherical graphite particle.

That is, one aspect of the present invention provides an anode material for a lithium-ion battery including a spherical particle of graphite or graphite-carbon composite provided with pores on the surface and inner channels in the core part of the particle, the inner channels being interconnected to the pores.

Another aspect of the present invention provides a method for preparing the anode material, which includes:

preparing a spherical raw carbon particle with less crystallinity, amorphous or defect rich core;

first heating the spherical raw carbon particle at a temperature of 500 to 800° C. with a temperature rising rate of 15 to 30° C./min in an oxygen-containing atmosphere and the reached temperature maintaining for 1 to 4 hours; and second heating the particle after the first heating by rising the temperature up to 900 to 1200° C. with a temperature rising rate of 1 to 10° C./min in an inert atmosphere.

Still another aspect of the present invention provides a lithium ion battery including the above anode material.

Advantageous Effects of Invention

The aspect of the present invention can provide an anode material for a lithium ion battery that is excellent in capacity, rate capability as well as cyclability.

DESCRIPTION OF EMBODIMENTS

Anode Material for Li-Ion Battery

One exemplary embodiment of the present invention relates to an anode material for a lithium ion secondary battery. The anode material includes a spherical particle of graphite or graphite-carbon composite provided with pores on the surface and inner channels in the core part of the particle, the inner channels being interconnected to the pores.

Fabrication Method

Figure 1:
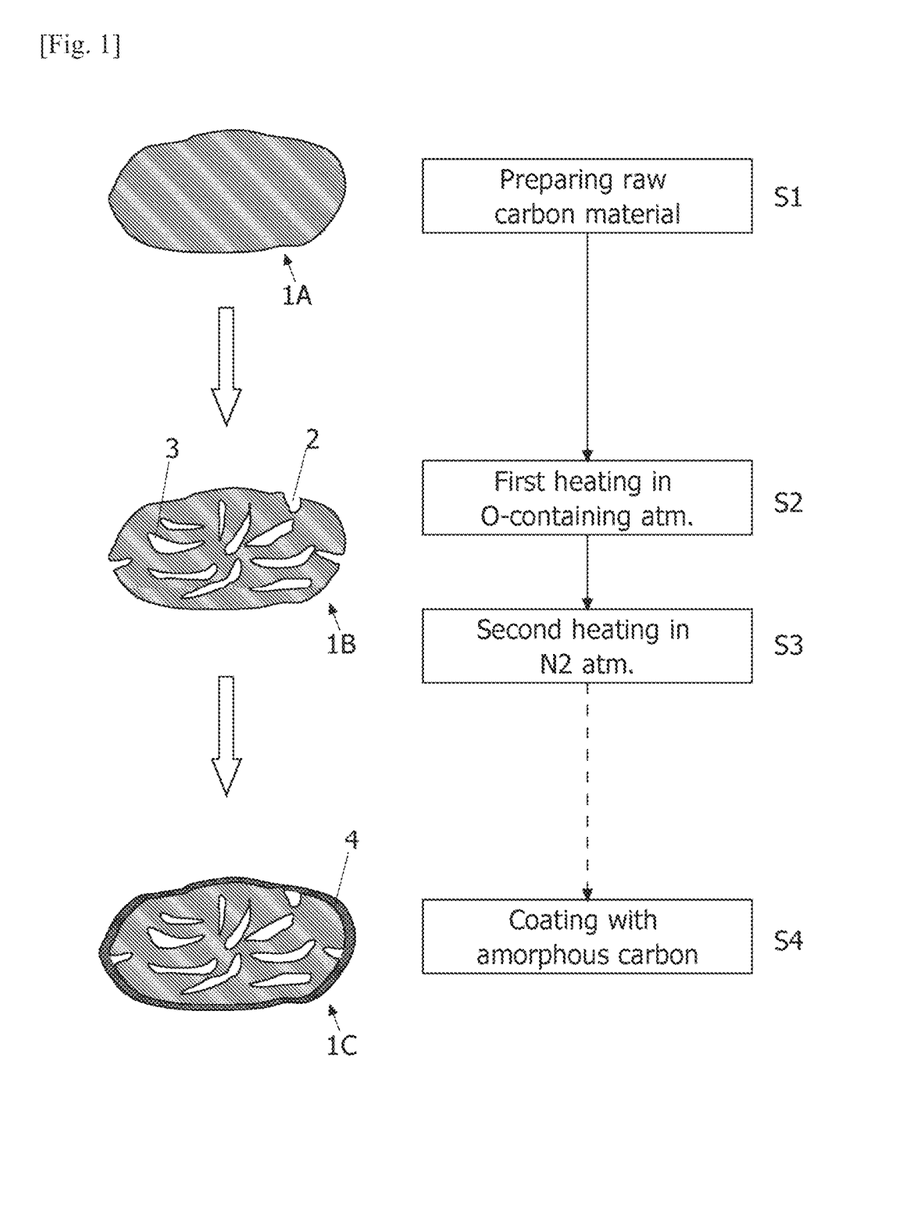
FIG. 1 is schematic illustrations of the invention.

The fabrication procedure of the anode material for the present embodiment is described as follows with referring to FIG. 1:

(S1) Graphite or graphite-carbon composite with less crystallinity, amorphous or defect rich core is prepared as a raw material 1A.

(S2) The raw material 1A is subjected to a first heating in an oxygen-containing atmosphere. The first heating can be carried out in an oven at a temperature of 500 to 800° C. with a temperature rising rate of 15 to 30° C./min. The concentration of oxygen is 5% to 30% by volume. Air can be used as the oxygen-containing atmosphere. The temperature and atmosphere are kept for 1 to 4 hours to activate core part of the raw material from the surface.

(S3) Thus activated carbon material is then subjected to a second heating in an inert atmosphere at a temperature higher than the temperature of the first heating with the slower temperature rising rate than the first heating. For example, the oven is first vacuumed, and then filled with 100% nitrogen and heated up to 900 to 1200° C. with the temperature rising rate of 1 to 10° C./min. The second heating can be carried out for 2 to 6 hours to obtain the anode material 1B of the present embodiment. According to the slower rising rate, the morphology of the activated particle in the first heating can be maintained. The anode material 1B has pores 2 on the surface and inner channels 3 in the core part. The time of the second heating can include the temperature rising period.

(S4) Thus obtained anode material can be further covered with amorphous carbon coating 4.

The raw material used is especially important for this invention. The raw carbon materials can be preferably selected from the carbon particles with low crystallinity, or amorphous content, or defects rich in the core part of the carbon particles. Graphite with high crystallinity core is hard to be etched to form the inner channel by the above process. The $I_D/I_G$ ratio of the core part of the raw material is preferably not less than 0.189. The crystal size in the core part is preferably not more than 50 nm. After the process, low crystalline, amorphous or defects rich core parts are etched to form the inner channel structure so that the $I_D/I_G$ ratio decreases below 0.189, more preferably 0.13 or less.

As for the raw material, carbon materials can be selected from graphite such as natural graphite and artificial graphite, graphite-carbon composites such as graphitic coke, meso carbon micro bead, soft carbon, hard carbon, carbon fiber with less crystallinity or amorphous in cores, and other defect rich carbon in core part. These carbon materials are formed to spherical particles. The spherical particles can be obtained by known spheroidizing methods such as mechanical milling and the like. Commercially available spheroidized natural graphite can be used as the raw material. The raw carbon particles can have an average particle size of 5 μm to 30 μm.

The present invention proposes to activate the core parts of spherical particles into an inner channel structure; more specifically the core part is modified to have cracks or hollow spaces such as interconnected pores and holes after activation. Generally, the raw carbon materials are usually very dense in the core part, which is hard for lithium ion for intercalation and diffusion. As a result, the spherical carbon particle has a worse rate capability and poor cyclability in high rate. However, in this invitation, the inner channel structure can provide much increased lithium ion intercalation sites on both the surface and core of the carbon particles, result in a much larger exchange current during charging and discharging for a smaller charge transfer resistance than the non-activated carbon material. Therefore, the activated carbon particle with the inner channel structure is excellent in the fast charging property.

The core part is defined as the inner region of 70% by volume of the carbon particles.

Spherical natural graphite is most common commercially available materials for lithium ion battery anode material. However, the exposed surface are almost graphite basal plane which is unable to be intercalated by lithium ions while charging and discharging, which is attributed to poor cyclability in high-rate and low-rate capabilities. This invention is to introduce cracks or pores on the basal plane and core part of the spherical natural graphite particles for better rate performance. Regarding to the cracks, holes and pores, they are preferably formed on the basal plane which only has defects or micro pores. As a result, after the process of special air oxidation, a lot of pores and holes can be developed on the basal plane of carbon materials that create more sites for lithium to intercalate or de-intercalate. The depth of the holes or pores can be 100 nm or more, preferably 500 nm or more, most preferably 1 μm to 3 μm. These holes or pores can increase the lithium ion intercalation and de-intercalation sites and reduced the length of the lithium ion diffusion path so as to improve a fast chargeable and dischargeable properties. Moreover, the inner core parts of the carbon material with low crystallinity, or amorphous content, or defect rich are also very easily etched by the entered oxygen-containing gas. As a result, both surface and the inner core parts can be etched with cracks, which increased the lithium ion intercalation sites and reduced the length of the diffusion path. So the proposed material has much more lithium ion reaction site and much reduced diffusion path compared with the pristine spherical graphite materials.

For the density of holes or pores on the surface, it is sufficient to increase the rate capability if the density is in the range of 0.5 to 500 portions per $\mu m^2$. However, the higher density will cause more increase of the surface area resulting in increase of unfavorable side effects.

The activated particle preferably has an average pore size of the material not less than 0.12 $\mu m$ measured by mercury intrusion method. The average pore size is preferably not greater than 1 $\mu m$.

The activated particle preferably has an average pore volume measured by mercury intrusion method in a range of 0.2 $cm^3/g$ to 0.44 $cm^3/g$.

With regard to a porosity of the core part of the activated particle after the air etching, it is preferably in a range of 10% to 75%. The larger porosity can provide better rate capability, but causes in smaller density of the material which is impractical in high energy density lithium ion batteries. On the other hand, extra small porosity will have less improvement of the rate performance.

For the distribution of holes on the surface, it is preferred to have a hole distance between 1 and 5 $\mu m$ both inclusive, the uniform distribution of holes on the surface of carbon is the most preferred for a better rate capability.

A large tapping density is very important for the electrode materials to fabricate a lithium ion battery with high volumetric energy density. The severe etched graphite will have low density, the carbon material proposed in this invention have a tapping density preferably not less than 0.7 $g/cm^3$, more preferably not less than 0.8 $g/cm^3$. To satisfy this tapping density, the raw carbon particles preferably have higher tapping density.

Electro spin resonance (ESR) spectroscopy is also used for studying materials with unpaired electrons. The carbon samples are measured from 10 to 296K for the analysis of localized electrons and carriers. In general, the number of the localized electrons is inversely proportional to the number of the carriers. The larger number of the localized electrons means the fewer defects. The process proposed in this invention can increase the number of localized electrons and decrease the number of carriers, which mean the entire crystallite increased after fabricating the inner channel structure. The number of carriers is preferably not greater than 4.8E18/g and the number of localized electrons is preferably not less than 4.2E17/g.

The anode material can further include other anode active particles which are reactive with lithium ions. Examples of the other anode active particles include: (a) metals or semi-metals such as silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or intermetallic compounds are stoichiometric or nonstoichiometric; (c) oxides, carbides, nitrides, sulfides, phosphides, selenides, and tellurides of Si, Ge, Sn, Pb, Sb, Bi, Zn, Al, Fe, Ti, Ni, Co, or Cd, and their mixtures or composites; and (d) combinations thereof. There is essentially no constraint on the type and nature of the other anode active particles that can be used in practicing the present invention. Among them, particles of the metals or semi-metals or compounds of which at least one element is selected from the group consisting of Si, Sn, Al, Ge and Pb are preferable.

The fabricated carbon material can be finally coated with a thin layer of amorphous carbon by known methods such as CVD, magnetic sputtering, hydrothermal methods, or the like for filling the surface micropores for better coulombic efficiency.

Lithium Ion Battery

A lithium ion battery of one exemplary embodiment of the present invention includes positive and negative electrodes, and the negative electrode includes the anode material of the above exemplary embodiment.

As for active materials of the positive electrode, but there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$) and lithium nickel cobalt manganese oxide (LiN-$i_xCo_yMn_zO_2$ where $x>0$, $y>0$, $z>0$ and $x+y+z=1$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles.

For the preparation of an electrode, a binder can be used. Examples of the binder include polytetrafluoroethylene (PTFE), polyvinylidene fluoride (PVDF), ethylene propylenediene copolymer (EPDM), or styrene-butadiene rubber (SBR). The positive and negative electrodes can be formed on a current collector such as copper foil for the negative electrode and aluminum or nickel foil for the positive electrode. However, there is no particularly significant restriction on the type of the current collector, provided that the collector can smoothly path current and have relatively high corrosion resistance. The positive and negative electrodes can be stacked with interposing a separator therebetween. The separator can be selected from a synthetic resin nonwoven fabric, porous polyethylene film, porous polypropylene film, or porous PTFE film.

A wide range of electrolytes can be used for manufacturing the cell. Most preferred are non-aqueous and polymer gel electrolytes although other types can be used. The non-aqueous electrolyte to be employed herein may be produced by dissolving an electrolyte (salt) in a non-aqueous solvent. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less (hereinafter referred to as a second solvent) may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous solvent solely composed of ethylene carbonate (EC) is advantageous in that it is relatively stable against decomposition through a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Further, in the electrolyte, in order to maintain a stable quality SEI layer on the negative electrode surface, additives may be added. The SEI layer has a role to suppress reactivity with the electrolyte solution (decomposition), and subjected to desolvation reactions due to delithiation of the lithium ion battery, and to suppress the structural physical degradation of the anode material. Examples of the additives include vinylene carbonate (VC), propane sultone (PS), and cyclic disulfonic acid ester.

Examples of the Li salt according to this exemplary embodiment include $LiPF_6$, $LiBF_4$, $LiAsF_6$, $LiSbF_6$, $LiClO_4$, $LiAlCl_4$, $LiN(C_nF_{2n+1}SO_2)(C_mF_{2m+1}SO_2)$ (n and m are natural numbers), and $LiCF_3SO_3$. However, the Li salt is not limited to these. One of these Li salts may be used, or two or more of these Li salts may be used in combination.

A casing for the battery in the exemplary embodiment may be, for example, a laminate film in which a substrate, a metal foil and a sealant are sequentially laminated. Examples of a substrate which can be used include a resin film with a thickness of 10 to 25 μm made of polyester (PET) or Nylon. A metal foil may be an aluminum film with a thickness of 20 to 40 μm. A sealant may be a rein film with a thickness of 30 to 70 μm made of polyethylene (PE), polypropylene (PP), modified polypropylene (PP) or an ionomer.

EXAMPLES

Comparative Example 1

Figure 2:
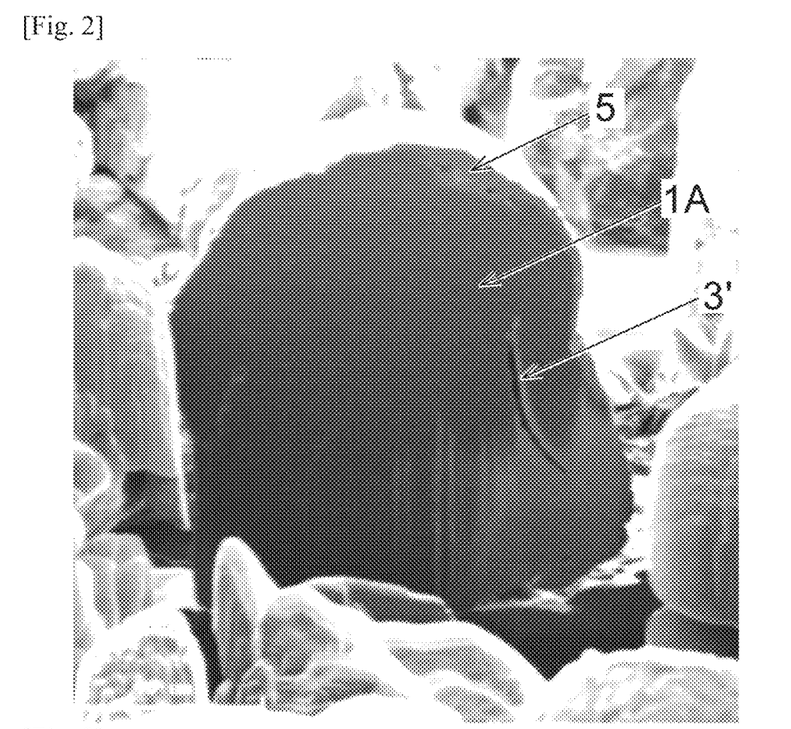
FIG. 2 is a SEM image of a cross section of a carbon material in Comparative Example 1.

10 g of spheroidized natural graphite with low crystallinity in the inner core part and the diameter of 20 μm was used as a material of Comparative Example 1. Cross section SEM image of the material is shown in FIG. 2. The sample was first covered by tungsten coating 5 and then cut by focused ion beam (FIB) apparatus. As shown in FIG. 2, few cracks 3' are observed but they are not interconnected to the surface.

Comparative Example 2

Figure 3:
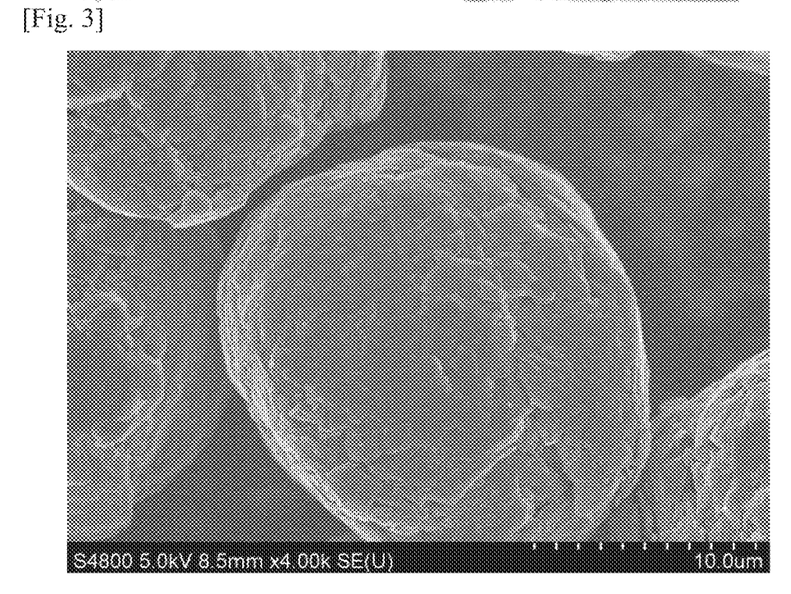
FIG. 3 is a SEM image of a carbon material in Comparative Example 2.

10 g of general spherical natural graphite with the diameter of 20 μm is used as a material of Comparative Example 2. SEM image of the material is shown in FIG. 3. As shown in FIG. 3, the surface of the material is smooth.

Example 1

Figure 4:
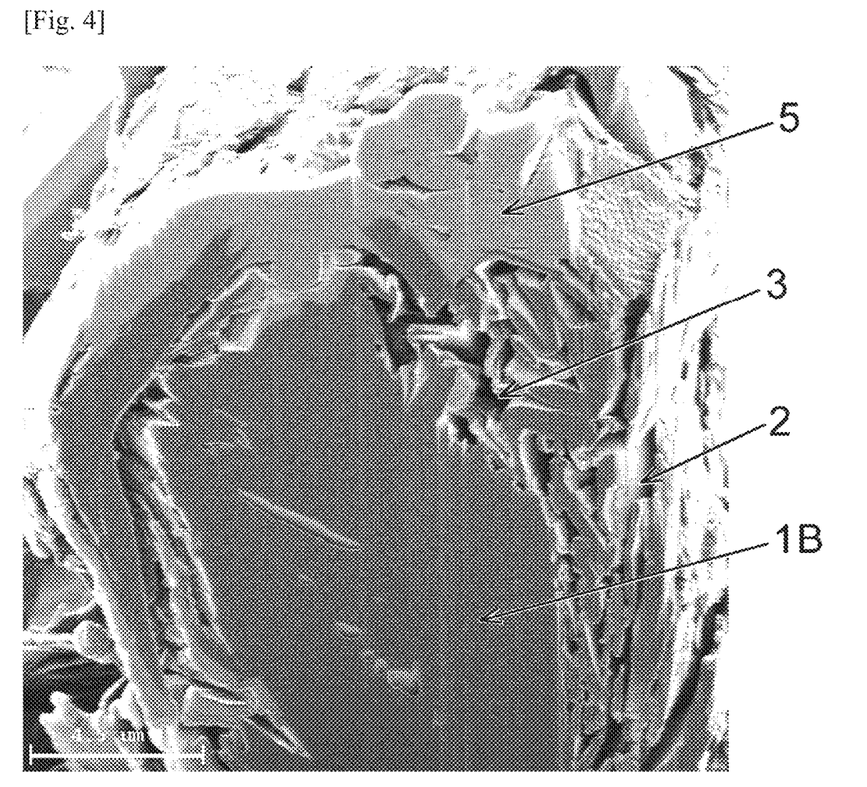
FIG. 4 is a SEM image of a cross section of a carbon material in Example 1.

The material of Comparative Example 1 was used as a raw material. The material was subjected to a first heating (thermal shock activation) by rising temperature to 650° C. with a temperature rising rate of 30° C./min in an oven under dry air atmosphere and kept at 650° C. for 2 hours. Then the temperature was dropped to less than 50° C. by nature cooling. After that, the oven was vacuumed and filled with 100% $N_2$ in 15 minutes. The oven was then heated up to 1000° C. from less than 50° C. with the rising rate of 1° C./min and kept in 1000° C. for 4 h. After the second heating process, the oven was cooled to less than 50° C. and the material is used as Example 1. Cross section SEM image of the material of Example 1 is shown in FIG. 4. It can be learned that the interlayers of the spherical carbon particles are etched by air to form inner channel 3. However, there is not so many cracks inside of the carbon particles because the first heating was carried out at the lower temperature and for the shorter time.

Example 2

Figure 5:
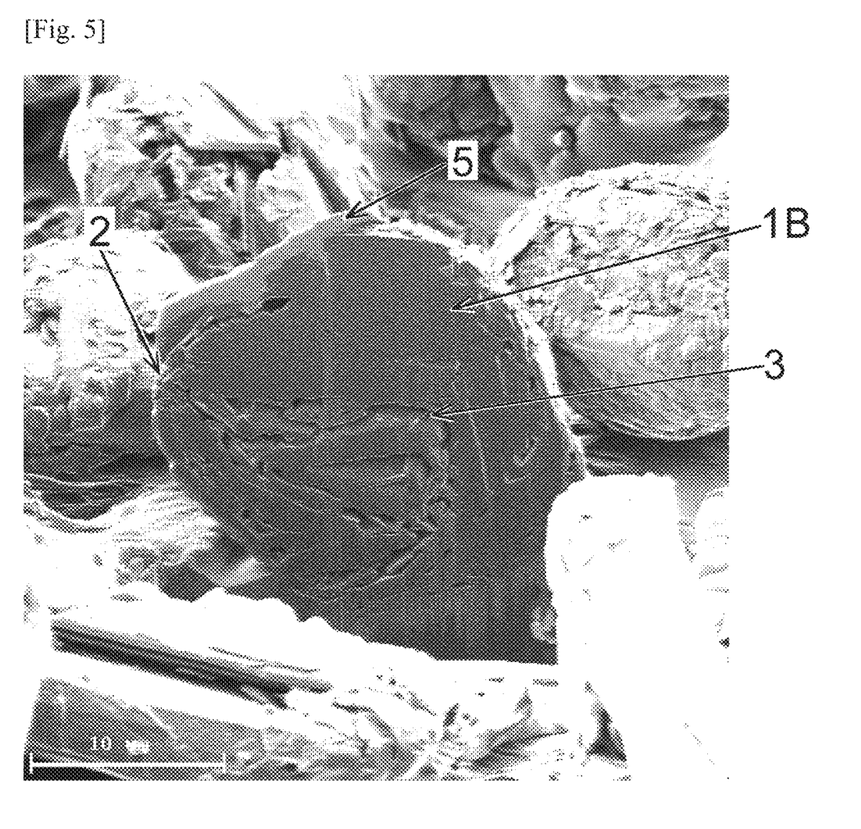
FIG. 5 is a SEM image of a cross section of a carbon material in Example 2.

Example 2 was performed in the same manner as in Example 1 except for changing the first heating temperature to 750° C. Cross section image of the material of Example 2 is shown in FIG. 5. This sample was activated at a higher temperature than Example 1, so the inner channels 3 were created more inside of the core part.

Example 3

Figure 6:
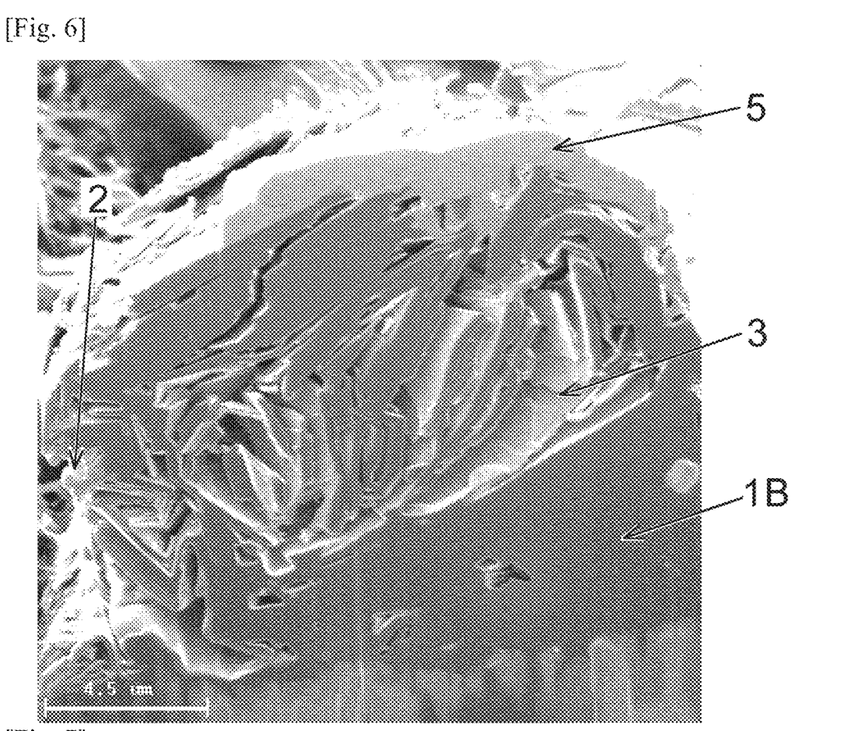
FIG. 6 is a SEM image of a cross section of a carbon material in Example 3.

Example 3 was performed in the same manner as in Example 2 except for changing the holding time of the first heating to 4 hours. Cross section image of the material of Example 3 is shown in FIG. 6. This sample was obtained in the same temperature with Example 2 but longer holding time. It can be learned that the inner core parts were heavily etched by air to increase inner channels 3.

Example 4

Figure 7:
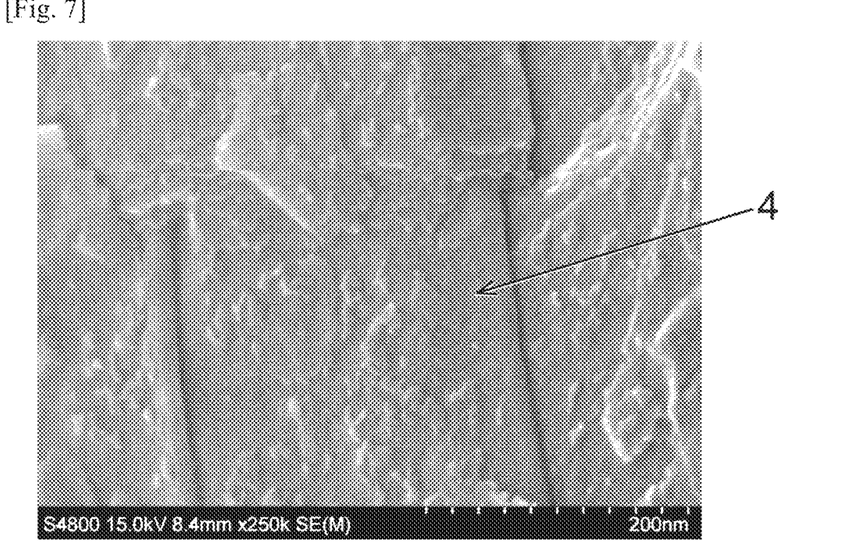
FIG. 7 is a SEM image in high magnification of a carbon material after coating amorphous carbon in Example 4.

The material prepared in Example 3 was covered with an amorphous carbon coating. The amorphous carbon coating was prepared by a CVD process using a horizontal furnace. Methane was used as a source gas with a flow rate of 80 mL/min. The CVD process was carried out under ambient pressure at a temperature of 1000° C. The coating time was 30 minutes. After the process, carbon coated particles were cooled down to room temperature in an inert atmosphere. The thickness of the carbon coating is around 10 nm. FIG. 7 shows a SEM image in high magnification of the carbon materials after forming the amorphous carbon coating 4.

Fabrication of Test Cell

Each prepared anode material, carbon black, carboxymethyl cellulose (CMC) and styrene-butadiene rubber (SBR) were mixed in a weight ratio of 91:3:4:2 and the resultant mixture was dispersed in pure water to prepare negative slurry.

The negative slurry was coated on a Cu foil as a current collector, dried at 120° C. for 15 min, pressed to 45 μm thick with a basis weight of 80 g/m$^2$ and cut into 22×25 mm to prepare a negative electrode. The negative electrode as a working electrode and a metal lithium foil as a counter electrode were stacked by interposing porous polypropylene film therebetween as a separator. The resultant stack and an electrolyte prepared by dissolving 1M LiPF$_6$ in a mixed solvent of ethylene carbonate (EC) and diethyl carbonate (DEC) in a volume ratio of 3:7 were sealed into an aluminum laminate container to fabricate a test cell. The anode materials were also characterized in full cell. The full cell was fabricated by using a positive electrode in which cathode slurry made of lithium iron phosphate, carbon black, PVDF with a weight ratio of 87:6:7 is coated on an Al foil.

Figure 8:
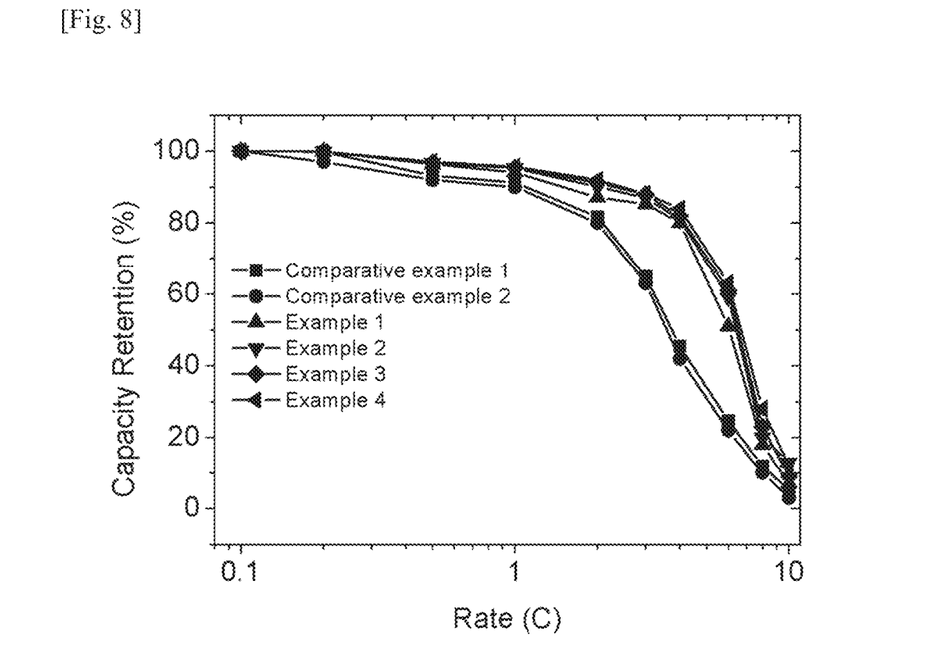
FIG. 8 shows charge rate capabilities in full cells of Comparative Examples 1-2 and Examples 1-4.

FIG. 8 shows the charge rate capability in full cell. The materials of Comparative Examples 1 and 2 and Examples 1-4 with fabricated into anode electrode with mass deposition of around 100 g/m$^2$. With regard to the charge rate capability test, the full cells were fabricated with cathode materials of LiNi$_{1/3}$Co$_{1/3}$Mn$_{1/3}$O$_2$ and electrolyte of 1M LiPF$_6$ in EC/DEC (3:7). The cells were charged to 4.2V in 0.1 C, 0.2 C, 0.5 C, 1 C, 2 C, 3 C, 4 C, 6 C, 8 C, 10 C and discharged to 2.5V in 0.1 C. It can be learned that the materials proposed in this invention (Examples 1 to 4) have better rate performance than their counterparts. The test cells were also evaluated in initial charge capacity, efficiency, rate capability and cyclability and summarized in Table 1. It has showed that the anode materials of Examples 1 to 4 have better rate capability, cyclability, and coulombic efficiency than Comparative Examples 1 and 2. The physical properties are summarized in Table 2.

TABLE 1

Electrochemical summary

| | Capacity (mAh/g) | Coulombic efficiency (%) | 1 C./ 0.1 C. (%) | 4 C./ 0.1 C. (%) | 6 C./ 0.1 C. (%) | 10 C./ 0.1 C. (%) | Capacity retention after 100 cycles (%) |
|---|---|---|---|---|---|---|---|
| Comparative Example 1 | 333 | 91 | 91 | 45 | 25 | 5 | 91 |
| Comparative Example 2 | 364 | 90 | 90 | 42 | 22 | 3 | 87 |
| Example 1 | 365 | 93 | 94 | 80 | 51 | 7 | 96 |
| Example 2 | 359 | 93 | 95 | 81 | 59 | 13 | 97 |
| Example 3 | 361 | 93 | 95 | 82 | 61 | 9 | 96 |
| Example 4 | 350 | 95 | 96 | 84 | 63 | 12 | 98 |

TABLE 2

Physical properties summary

| | Specific surface area (m$^2$/g) | Average pore size (μm) | Average pore volume (cm$^3$/g) | $I_D/I_G$ of core part | Localized electron (number/g) | Carrier (number/g) | Tapping density (g/cm$^3$) | Core porosity (%) |
|---|---|---|---|---|---|---|---|---|
| Comparative Example 1 | 6.5 | 0.11 | 0.16 | 0.29 | 3.8E+17 | 5.8E+18 | 1.1 | <3 |
| Comparative Example 2 | 4.0 | 0.07 | 0.10 | 0.05 | 2.1E+17 | 6.3E+18 | 1.2 | <1 |
| Example 1 | 5.6 | 0.16 | 0.22 | 0.13 | 4.2E+17 | 4.8E+18 | 0.9 | 10 |
| Example 2 | 5.4 | 0.16 | 0.23 | 0.11 | 4.8E+17 | 2.9E+18 | 0.87 | 20 |
| Example 3 | 5.4 | 0.16 | 0.23 | 0.07 | 5.0E+17 | 2.3E+18 | 0.87 | 45 |
| Example 4 | / | / | / | 0.32 | / | / | 0.87 | 45 |

Specific surface area, average pore size, average pore volume, $I_D/I_G$ ratio in the core part, localized electron and carrier numbers, tapping density and core porosity were determined by the following procedures:

Specific surface area, average pore size and average pore volume:

The gas adsorption was measured by BELSORP18P-LUSUS-HT with the samples pretreated in 200° C. for 5 h. The specific surface area was calculated by Brunauer-Emmett-Teller (BET) theory and the pore distribution is analyzed by both MP (0.4-2 nm) and BJH (2-200) method. Temperature programed desorption-mass spectrometry (TPD-MS, GC/MS QP2010plus10) is used to analysis the mass spectrometry from room temperature to 1000° C. at the speed of 10° C./min in He atmosphere. The mercury intrusion method was also used to analysis the specific surface area and pore distribution. The samples were measured under the pressure from 4 kPa to 400 Mpa. The pore size from 3 nm to 400 μm were characterized by this method. The data used in Table 2 are measured from mercury intrusion method.

$I_D/I_G$ Ratio in the Core Part:

Cross section of the sample material was observed by Raman spectroscopy (NRS-7000 series) with maximum resolution of 0.7 cm$^{-1}$/0.3 cm$^{-1}$ and measurement range from 50 to 8000 cm$^{-1}$. Peak intensity ($I_G$) near 1570-1600 cm$^{-1}$ and peak intensity ($I_D$) near 1350 cm$^{-1}$ were measured.

Localized Electron and Carrier Numbers:

These numbers were measured by electron spin resonance (ESR) spectroscopy under 10, 20, 40, 100, 160, 220, 294K in the magnetic of 3377 G, The sweep width of the magnetic field is 2000 G. The numbers of localized electron and carrier were calculated.

Tapping Density:

Tapping density was measured using a powder measuring apparatus, JV2000 (manufactured by Copley Scientific). The carbon particles were filled in 250 ml tap cell and then the cell was tapped 500 times.

Core Porosity:

Core porosity was determined from the area of the core part versus the area of the cracks in the core part under the microscope.

It can be learned from Table 2 that the anode materials of the present invention satisfy the parameters defined in claims. Due to amorphous carbon coating, the crystallinity of the core part in Example 4 is reduced. This means that the amorphous carbon intrudes into the inner channels.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1A: Law material particle
1B: Activated graphite particle
1C: Carbon coated activated graphite particle
2: Holes or pores on the surface
3: Inner channels
4: Carbon coating
5: Tungsten coating

The invention claimed is:

1. An anode material for a lithium ion battery, the material comprising a spherical particle of graphite or graphite-carbon composite provided with pores on the surface and inner channels in the core part of the particle, the inner channels being interconnected to the pores,
   wherein the spherical particle has a number of carriers not greater than 4.8E18/g and a number of localized electrons not less than 4.2E17/g,
   wherein the spherical particle is not covered with an amorphous carbon coating, and
   wherein the spherical particle is obtained by:
      first heating the spherical raw carbon particle at a temperature of 500 to 800° C. with a temperature rising rate of 15 to 30° C./min in an oxygen-containing atmosphere and the reached temperature maintaining for 1 to 4 hours; and
      second heating the particle after the first heating by rising the temperature up to 900 to 1200° C. with a temperature rising rate of 1 to 10° C./min in an inert atmosphere.

2. The anode material as claimed in claim 1, wherein the average pore size of the spherical particle is not less than 0.12 μm measured by mercury intrusion method.

3. The anode material as claimed in claim 1, wherein the average pore volume of the spherical particle is 0.2 cm$^3$/g to 0.44 cm$^3$/g measured by mercury intrusion method.

4. The anode material as claimed in claim 1, wherein the porosity in the core part of spherical particle is 10% to 75%.

5. The anode material as claimed in claim 1, wherein the spherical particle has a tapping density of higher than 0.7 g/cm$^3$.

6. A lithium ion battery comprising the anode material as claimed in claim 1.

7. A lithium ion battery comprising the anode material as claimed in claim 2.

8. A lithium ion battery comprising the anode material as claimed in claim 3.

9. A lithium ion battery comprising the anode material as claimed in claim 4.

10. A lithium ion battery comprising the anode material as claimed in claim 5.

* * * * *